M. MOEHRLE.
DISINFECTOR.
APPLICATION FILED JAN. 27, 1913.
1,086,331.
Patented Feb. 3, 1914.
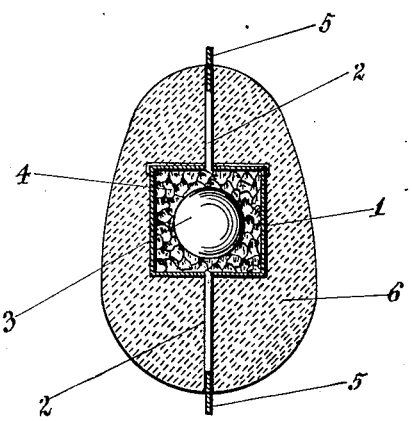
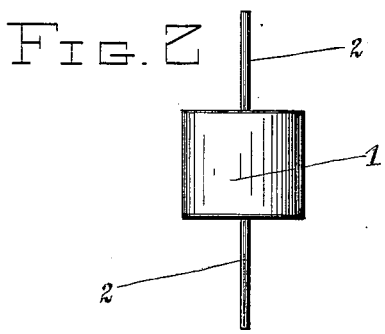
Witnesses
Inventor
Martin Moehrle
By Gustav W. Wiegand
Attorney

UNITED STATES PATENT OFFICE.

MARTIN MOEHRLE, OF OAKLAND, CALIFORNIA.

DISINFECTOR.

1,086,331. Specification of Letters Patent. Patented Feb. 3, 1914.

Application filed January 27, 1913. Serial No. 744,460.

*To all whom it may concern:*

Be it known that I, MARTIN MOEHRLE, a citizen of the United States, residing at Oakland, in the county of Alameda and State of California, have invented certain new and useful Improvements in Disinfectors, of which the following is a specification.

My invention relates to certain new and useful improvements in disinfecting devices, and has for its object the provision of novel means for shielding the disinfecting materials, so as to obviate danger of such disinfecting materials causing injury or damage to objects or animals with which the same may come in contact, especially when placed within the nests of poultry for disinfecting purposes.

A further object of the invention is to provide a device for the above purpose extremely simple in its construction, comparatively inexpensive to manufacture, and which may be used at any place infested with vermin.

The invention will hereinafter be specifically described and then claimed, and in such description, reference will be had to the accompanying drawing illustrating an embodiment of the invention as practised by me, and in which drawings like numerals of reference will be employed to indicate like parts throughout the several views, in which:

Figure 1, is a view in elevation of a disinfector with my improved container for the disinfecting materials, the latter being shown in section, and Fig. 2, is an elevation of the disinfectant container.

My said disinfectant container 1, is by preference although not necessarily, made from a sheet metal which is stamped in dies, to form the container part, and a cap, or cover part for the said container part, in such a manner, that the two parts or halves of the container form a suitable vessel for the disinfecting ingredients. 2, represents one or more, preferably two outflow-tubes, one in the bottom, and another in the cap or cover part of the said container, made of metal or other hard substance, and are of a tubular form, and of a much reduced internal diameter than the diameter of the said container, and firmly secured to the bottom and cover plates of the said container. This will be understood by an examination of Fig. 2. The disinfectant to be placed within the said container consists by preference of the ordinary mothball 3, surrounded by an absorbent medium preferably a sponge 4, saturated with a solution of two parts of turpentine and one part of formaldehyde. After inserting the said disinfecting ingredients within the said container, the two halves of the said container with the affixed outflow-tubes are firmly secured together, forming a liquid-tight vessel. The outflow-tubes are closed with a suitable material preferably a small cork 5, to prevent the escape of the disinfectant by evaporation until such time as the same may be required for service.

As shown in Fig. 1, I provide a suitable covering 6, for the said disinfectant container, said covering by preference consists of one part of hardwall plaster, one part of cast-plaster and one part of marble dust, the foregoing three parts are thoroughly mixed in cold water, after adding a small quantity of alum to effect a better adhesion of the same. This covering material, when in a suitable setting state for molding is formed into an oval or oblong figure, preferably of an egg shape, the disinfectant container placed within the center thereof, in such a manner as to prevent the outflow-tubes from extending beyond the extreme outer points of the egg shape covering.

Various slight changes might be made in the general form and arrangements of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An improved apparatus for disinfecting poultry nests by evaporation, comprising in combination a container, for the disinfecting substance, made of metal, and a cap or cover also made of metal, and such cap adapted to close the open end of the said container, outflow-tubes in the bottom and cover plates of the said container, means for closing the orifices of the said outflow-tubes, a suitable absorbent material placed within the said container in front of the outflow-tubes, substantially as described and for the purposes set forth.

2. An improved apparatus for disinfecting poultry nests by evaporation, comprising in combination a container, for the disinfecting substance, made of metal, and a cap or cover also made of metal, and such cap adapted to close the open end of the said container, outflow-tubes in the bottom and cover plates of the said container, means for closing the orifices of the said outflow-tubes, an imperforate body, constructed of plaster-of Paris, serving as an envelop for the said container and the said outflow-tubes, a suitable absorbent material placed within the said container in front of the outflow-tubes, substantially as described and for the purposes set forth.

In testimony whereof I affix my signature in presence of two witnesses.

MARTIN MOEHRLE.

Witnesses:
MARION C. BLUM,
H. LANCIL.

Copies of this patent may be obtained for five cents each, by addressing the "Commissioner of Patents, Washington, D. C."